(12) United States Patent
Gerde et al.

(10) Patent No.: US 7,930,642 B1
(45) Date of Patent: Apr. 19, 2011

(54) SYSTEM AND METHOD FOR INTERACTING WITH HARD COPY DOCUMENTS

(75) Inventors: Matthew E. Gerde, The Colony, TX (US); Jeffrey M. Wolfe, Parrish, FL (US)

(73) Assignee: Intuit Inc., Mountain View, CA (US)

( * ) Notice: Subject to any disclaimer, the term of this patent is extended or adjusted under 35 U.S.C. 154(b) by 658 days.

(21) Appl. No.: 12/052,423

(22) Filed: Mar. 20, 2008

(51) Int. Cl.
*G06F 3/048* (2006.01)
*G06F 3/00* (2006.01)
*G06F 17/00* (2006.01)
*G06K 7/00* (2006.01)
*H04N 1/46* (2006.01)
*G02B 5/32* (2006.01)

(52) U.S. Cl. ........ 715/764; 715/700; 715/200; 715/230; 382/312

(58) Field of Classification Search .................. 715/764, 715/700, 200, 230; 382/312; 358/505; 359/17
See application file for complete search history.

(56) References Cited

U.S. PATENT DOCUMENTS

| | | | |
|---|---|---|---|
| 6,631,457 B1 | 10/2003 | Ohba | |
| 7,181,502 B2* | 2/2007 | Incertis | 709/217 |
| 7,236,162 B2 | 6/2007 | Morrison et al. | |
| 7,297,058 B2 | 11/2007 | Gomez et al. | |
| 7,310,779 B2* | 12/2007 | Carro | 715/763 |
| 7,358,962 B2 | 4/2008 | Dehlin et al. | |
| 2003/0041206 A1* | 2/2003 | Dickie | 710/303 |
| 2003/0100963 A1* | 5/2003 | Potts et al. | 700/83 |
| 2003/0217336 A1* | 11/2003 | Gounares et al. | 715/541 |
| 2005/0227217 A1 | 10/2005 | Wilson | |
| 2005/0240871 A1 | 10/2005 | Wilson | |
| 2005/0275636 A1* | 12/2005 | Dehlin et al. | 345/173 |
| 2006/0007123 A1 | 1/2006 | Wilson et al. | |
| 2006/0010400 A1 | 1/2006 | Dehlin et al. | |
| 2006/0092170 A1 | 5/2006 | Bathiche et al. | |
| 2006/0214907 A1 | 9/2006 | Devos et al. | |
| 2007/0157095 A1 | 7/2007 | Bilow et al. | |
| 2007/0247673 A1* | 10/2007 | Rosenfeld et al. | 358/474 |
| 2007/0260675 A1 | 11/2007 | Forlines et al. | |
| 2008/0279348 A1* | 11/2008 | Carro | 379/88.04 |
| 2009/0002327 A1* | 1/2009 | Wilson et al. | 345/173 |

OTHER PUBLICATIONS

U.S. Appl. No. 12/126,382, filed May 23, 2008.
"Microsoft Surface, Future of Computers," blog.800HighTech.com, blog.800hightech.com/microsoft-surface-future-of-computers/512/, Jun. 5, 2007, 8 pages.

(Continued)

*Primary Examiner* — Ting Lee
(74) *Attorney, Agent, or Firm* — Osha • Liang LLP

(57) ABSTRACT

Systems and methods for facilitating user interaction with physical documents. A system may include a physical document interface configured to receive a physical document having a surface including document data items, such that at least a portion of the surface of the physical document is visible to a user. The system further includes a device including a computer-readable storage medium storing program instructions executable by the device to implement an application, which may be executable to display a user interface including application data items, each of which may be selectable via the user interface. In response to the selection of a given application data item via the user interface, the device is configured to cause the physical document interface to visibly indicate a location on the surface of the physical document, where the location includes a document data item corresponding to the application data item selected via the user interface.

20 Claims, 4 Drawing Sheets

OTHER PUBLICATIONS

"First Look: Microsoft Milan Surface Computer—A Table That Knows What's On It," Wired, blog.wired.com/gadgets/2007/05/first_look_micr.html, May 29, 2007, 5 pages.

"What is Microsoft Surface?," ProgrammerWorld.NET, faq.programmerworld.net/cool-gadgets/what-is-microsoft-surface.html, 3 pages, 2008.

"Microsoft Surface: My Dream Interactive Table," Kiwipulse, www.kiwipulse.com/microsoft-surface-my-dream-interactive-table, Apr. 3, 2008, 15 pages.

"Rosie Coffee Table is Apple Surface," Gizmodo, gizmodo.com/gadgets/savant/rosie-coffee-table-is-apple-surface-296534.php, Sep. 5, 2007, 5 pages.

"Hands on the Rosie Apple-Powered Multitouch Table," Gizmodo, gizmodo.com/gadgets/apple/hands-on-the-rosie-apple+powered-multitouch-table-verdict-meh-297282.php, Sep. 6, 2007, 8 pages.

"Crave TV: Hitachi StarBoard interactive surface," CNET.co.uk, crave.cnet.co.uk/video/0,139101587,49295106,00.htm, Jan. 16, 2008, 5 pages.

"Surface computer," Wikipedia, en.wikipedia.org/wiki/Surface_computer, 1 page, Oct. 8, 2007.

"Patent Problems with Multitouch," SurfaceRama.com, www.surfacerama.com/2008/03/26/patent-problems-with-multitouch, Mar. 26, 2008, 4 pages.

"Multi-touch possibilities," BillDay.com, billday.com/2007/03/02/multi-touch-possibilities, Mar. 2, 2007, 4 pages.

Home page, Perceptive Pixel, perceptivepixel.com, 2007, 1 page.

"Microsoft Surface: Behind-the-Scenes First Look," Popular Mechanics, www.popularmechanics.com/technology/industry/4217348.html, Jul. 2007, 5 pages.

Home page, Microsoft Surface, www.microsoft.com/surface/index.html, 1 page, 2008.

"Tales from the Microsoft Surface Team: Surface launches at AT&T stores," blogs.msdn.com/surface/archive/2008/04/19/surface-launches-at-at-t.aspx, Apr. 19, 2008, 4 pages.

* cited by examiner

SYSTEM AND METHOD FOR INTERACTING WITH HARD COPY DOCUMENTS

BACKGROUND

Description of the Related Art

As computing technology for business and personal use continues to proliferate, many modes of generating and manipulating information have shifted to the purely digital realm. For example, with the advent of electronic commerce, "paperless" transactions, in which every aspect of the transaction may take place through electronic exchanges of information, have become commonplace. Despite this trend, physical documents are still very much in use as sources of information in various contexts. As a result, a significant amount of electronic information may originate from and/or may need to be validated against physical (i.e., non-electronic) documents.

Interfacing electronic information with physical documents presents a variety of challenges, such as that of converting human-readable content into a form suitable for electronic processing. This process is often conducted through manual data entry or automated techniques such as optical character recognition. However, even the best available techniques present the possibility of introducing errors in the course of data conversion. For example, in manual data entry, a data item from a physical document may be miskeyed, while in automated techniques, such a data item may be incorrectly recognized.

Additionally, the management of information that occurs in both electronic form and in physical document form may present challenges. For example, users who are familiar with a physical document may be unfamiliar with how its data relates to a particular electronic application that uses the data. Conversely, users familiar with an electronic application may not be able to quickly locate relevant portions of related documents. These types of gaps may hamper the productivity of users who need to interact with information that is distributed across the physical and electronic domains.

SUMMARY

Various embodiments of systems and methods for facilitating user interaction with physical documents are disclosed. In one embodiment, a system may include a physical document interface configured to receive a physical document having a surface including document data items, such that at least a portion of the surface of the physical document is visible to a user. The system may further include a device including a computer-readable storage medium storing program instructions executable by the device to implement an application. The application may be executable to display a user interface including application data items, each of which may be selectable via the user interface. In response to the selection of a given application data item via the user interface, the device may be configured to cause the physical document interface to visibly indicate a location on the surface of the physical document, where the visibly indicated location includes a document data item corresponding to the application data item selected via the user interface.

In one embodiment, a method may include a physical document interface receiving a physical document, such that at least a portion of a data surface of the physical document is visible to a user. In response to the user selecting a given data item displayed by an application, the method may further include the physical document interface visibly indicating a corresponding area within the physical document to the user.

Figure 1:
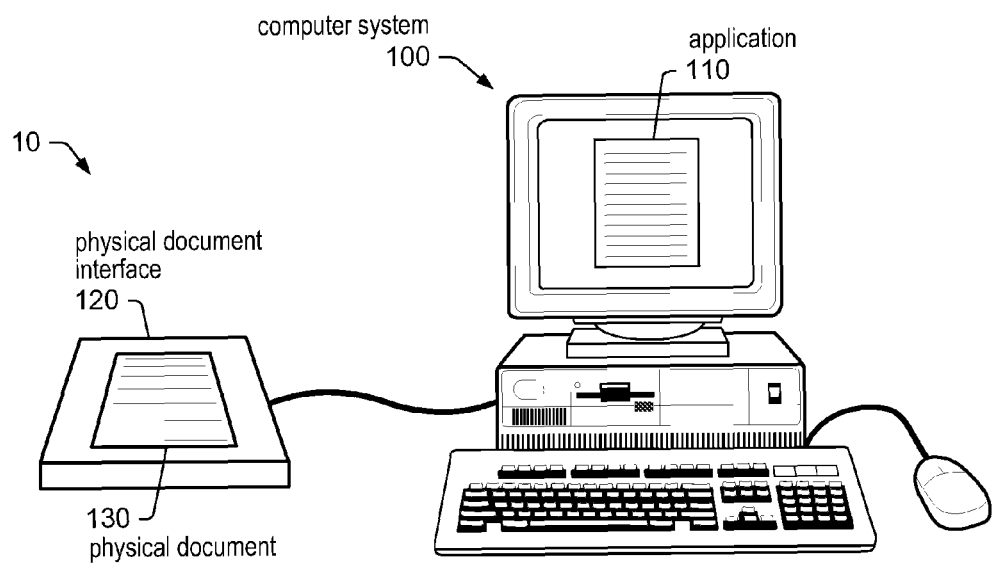
FIG. 1 is a block diagram illustrating one embodiment of an interactive document system.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but on the contrary, the intention is to cover all modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

As noted above, the use of computing technology for storage and processing of more and more types of content via computer systems and network-accessible resources is increasing the necessity for accurate data entry and processing, and for mutual verification and cross-checking of related documents and applications. With the proliferation of types of content and processing capability, and the growing consonant complexity of relevant computing systems, there is a need for methods to ease the burdens of operating such complex systems, and to mitigate the amount of human effort expended in the entry, processing, and verification of data. For example, the entry and processing of data from physical documents, and subsequent comparison of their electronic representations within computer applications can be very laborious for humans. Additionally, understanding the relationships between myriad computer applications and related physical documents can require considerable expenditure of human effort, especially as the variety and complexity of such applications and associated documents increases. Automated computer assistance in aiding such understanding, and in easing the human effort required for the entry and processing of data is sorely needed. The increasing power and sophistication of both hardware and software affords an opportunity to harness their potential to relieve the burden of operation for humans.

In the following discussion, various embodiments of systems and techniques for facilitating user interaction with physical documents are explored. In particular, a physical document interface configured to facilitate such user interaction is described in detail. By using such an interface, for example in conjunction with a computer-based application that uses data derived from physical documents, a user may more readily identify data discrepancies that may arise from a data entry or data conversion process, or may more easily understand how a document and an application relate to one another.

First, a general overview of an interactive document system is provided. Next, various techniques through which such a system may be employed to perform interactive document management functions are discussed. Finally, an exemplary computer system embodiment that may be employed to implement aspects of the interactive document system is described.

Interactive Document System

One embodiment of an interactive document system is illustrated in FIG. 1. In the illustrated embodiment, interactive document system 10 (or simply, system 10) includes a computer system 100 that is configured to execute an application 110. Computer system 100 is configured to communicate with a physical document interface 120 that is configured to receive a physical document 130.

Generally speaking, computer system 100 may correspond to any suitable type of computer system configured to execute applications. For example, computer system 100 may correspond to a desktop computer system, a laptop or notebook computer, a handheld computing device such as a personal digital assistant, cellular phone, media player, or combination device, or any other suitable type of device. In various embodiments, computer system 100 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, or similar device. They may also include an image scanner or web cam for image or video input. Output systems may variously include a video subsystem including a video monitor or other display device, an audio subsystem, or other types of output devices. In some embodiments, computer system 100 may be configured to execute one or more operating systems, such as Microsoft Windows™, Apple MacOS™, Linux™, or any other suitable operating systems. One exemplary embodiment of computer system 100 is discussed in greater detail below in conjunction with the description of FIG. 8.

In various embodiments, application 110 may be configured to perform any of a wide variety of tasks. Application 110 may be configured to display or edit text. Exemplary applications of this type are Microsoft Notepad, SimpleText, AbiWord, Emacs, and Microsoft Word, among many others. Application 110 may be configured to work with various structured data or forms, such as tax forms, medical forms, insurance forms, lottery forms, shipping forms, order forms, tickets, voting ballots, or any of a variety of other such forms, or templates. Exemplary applications 110 may include web browsers, tax preparation software, accounting software, spreadsheet software, and many other systems for managing structured data or forms. In some embodiments, application 110 may be configured to work with other types of data, instead of or in addition to form-based data, such as graphical or audio data, for example. In various embodiments, application 110 may be configured to perform any suitable function to process, analyze, or transform data obtained from input sources (e.g., forms, files, or other sources), and/or may facilitate the creation of new data. For example, a tax application may be configured to analyze input financial data in order to determine tax liability, identify tax strategies, and the like.

In various embodiments, application 110 may be implemented via computer-executable program instructions stored by a computer-readable medium, as described in greater detail below in conjunction with the description of FIG. 8. In some embodiments, application 110 may be executable to display a user interface through which a user of application 110 may interact with various application data items managed by application 110. For example, such a user interface may be configured to display data items to a user, such as within a window or according to another display technique. The user interface may also be configured to receive and respond to user input to application 110, such as mouse, keyboard, touch, or other input activity detected by computer system 100. For example, the user interface may implement menus or other control features through which a user may perform various application functions. In some embodiments, application data items that may be displayed by and/or selected via application 110's user interface may include audio data items in addition to visual data. In some embodiments, application 110 may be configured to communicate with other applications or systems external to computer system 100, for example via a Local Area Network (LAN) or the Internet. Other types of applications are possible and contemplated. It is noted that while one application 110 is shown, other embodiments may include any number of applications 110.

In various embodiments physical document interface 120 may be configured for both input and output, or for output only. In one embodiment, physical document interface 120 may be configured to receive tactile input, which may include detecting touch or physical objects placed on physical document interface 120. These may encompass tools or brushes or fingers or other everyday objects, or a physical document like a Braille page, or other tactile renderings. In another embodiment, physical document interface 120 may be configured to receive optical input, which may include static or dynamic optical input. For example, input of optical data may encompass scanning functionality, such as to optically capture an image presented to physical document interface 120, or the detection of motion, shape, form, dynamic or static gestures, light patterns or pulses or codes, or other detectable optical information. In another embodiment, physical document interface 120 may be configured to receive electromagnetic input, which may be in the form of radio-based signals or data. For example, physical document interface 120 may be configured to receive input data from Radio Frequency Identifier (RFID)-tagged objects, and/or may receive data according to various wireless interface protocols such as Bluetooth or Wi-Fi, for example. In some embodiments, physical document interface 120 may be configured to implement combinations of these types of input and/or other input types. Also, in some embodiments, physical document interface 120 may be configured to communicate received input data to another device, such as computer system 100. While physical document interface 120 is shown as receiving one physical document 130, in other embodiments, it is contemplated that physical document interface 120 may receive and concurrently process multiple different physical documents 130.

Output from the physical document interface 120 may be visible or invisible. Visible output from the physical document interface 120 may be in the form of illumination appearing on the document or in its vicinity. Such visible illumination may appear beneath, to the side of, or above the document. For example, the illumination may be projected from underneath or from above onto the document surface. In some embodiments, physical document interface 120 may be configured to selectively provide visible output within specific areas of physical document interface 120. The selected areas may range in granularity from relatively coarse to relatively fine in various embodiments. For example, in one embodiment physical document interface 120 may include a pixel-addressable display, such as a liquid crystal display (LCD). In some embodiments, invisible output from the physical document interface may take the form of electromagnetic signals or data, including those that are radio-based.

One embodiment of the physical document interface 120 may include an ordinary flatbed document scanner configured to provide visible illumination using the lighting element normally used during scanning. In another embodiment, an ordinary flatbed scanner may be configured to provide visible illumination by means of an auxiliary lighting element distinct from the lighting element normally used during scanning. In some embodiments, the light source enabling output illumination on the physical document interface 120 may be configured to permit selectable illumination. This may entail controlling individual elements of the light source. Such selection may permit the lighting of chosen portions of the document rather than the entire document. For example, one flatbed scanner embodiment of physical document interface 120 may utilize a lighting element that is roughly the width of the scanner's document input surface, which may be swept along the length of the scanner's document input surface in order to sequentially illuminate an entire document. In one such embodiment, illumination of individual elements of the scanner's lighting element may be selectively controlled, such that portions of a document on the scanner's input surface may be visibly indicated.

Embodiments of physical document 130 may include structured or unstructured content. Such content may appear as a number of document data items included on a surface of physical document 130, which may correspond, for example, to a side of the document. Such a surface of a document may also be referred to as a data surface. In embodiments such as sheets of paper, physical document 130 may have two data surfaces, though more are possible (e.g., in embodiments where physical document 130 corresponds to a three-dimensional object). It is not necessary that all data surfaces of physical document 130 actually include content.

Generally speaking, structured content may include content that is divided into particular document data items such as, e.g., portions, sections, fields, or other suitable divisions, where the divisions are indicative of information about the content. In some embodiments, structured content may facilitate the association of a particular item of content with a corresponding type or category, such that the representation of the content via physical document 130 conveys both types of information. For example, physical document 130 may be a form having a number of fields that are defined to reflect particular types of information. In one embodiment, the structure of the content may be explicitly represented by labels, tags, or other identifiers of content structure. For example, in an embodiment where the document data items include various fields, the fields of a form may be individually labeled according to the type of content they represent: a field that includes name data may be labeled "Name;" fields that include income data may be respectively labeled "Interest Income" and "Wage Income;" and so forth. In another embodiment, the structure of the content may be represented according to its physical location within physical document 130. For example, numerical data located within a particular area of physical document 130 (as defined, for instance, relative to the document's dimensions, landmarks, or other frames of reference) may be defined as the document data item "Interest Income" regardless of whether physical document 130 is labeled as such. Exemplary structured-content physical documents 130 may encompass tax forms, medical forms, insurance forms, lottery forms, shipping forms, order forms, tickets, voting ballots, or any of a variety of other such forms, or templates.

By contrast, in other embodiments, physical document 130 may include unstructured content. Generally speaking, unstructured content may include free-form elements which may not necessarily be associated with particular types or categories indicative of some aspect of the content. For example, physical document 130 may include prose as unstructured content. It is noted that in some embodiments, even though the content of physical document 130 may be unstructured, a structure may be externally imposed upon such content, such as by application 110. For example, physical document 130 may include free text that bears no particular organization in terms of fields or categories. In one embodiment, application 110 may impose an organization upon such text, for example by parsing the text into lines, regions, paragraphs, sentences, words, phrases, or other elements. Some physical documents 130 may be implemented in either a structured or unstructured fashion, such as manuals, books, magazines, journals, catalogs, or any of a variety of such publications, which may include text, photographs, images, videos, and auditory or other information.

In some embodiments, physical document 130 may include special identifying marks, such as bar codes or watermarks. Such identifying marks may identify a particular physical document 130 as belonging to a particular category of document (e.g., a particular type or class of form) and/or may uniquely identify a particular instance of physical document 130 from among many or all other instances of physical document 130. Physical document 130 may also include certain patterning, such as crossing points of lines or lengths of lines, with the elements bearing certain relationships to each other. Patterns may encompass geometric or other formed data, images, or character or keyword combinations. In some embodiments, such patterns may serve as reference points from which other features of physical document 130 may be identified. In various embodiments, physical document 130 itself may be made of or may include paper, cloth, plastic, composite materials, semiconductor materials, nanotechnology materials, or any other suitable material, and may be opaque, translucent, transparent, or of variable opacity/transparency. In some embodiments, physical document 130 may be capable of sending or receiving electromagnetic data or signals, and the document may be constructed from materials capable of such sending or receiving. For example, in some embodiments, physical document 130 may include passive or active technology, such as antenna or semiconductor technology, configured to emit or to detectably respond to emitted electromagnetic signals, such that characteristics of physical document 130 (e.g., identifying characteristics) may be observed using techniques that do not involve visible or near-visible light.

Figure 2:
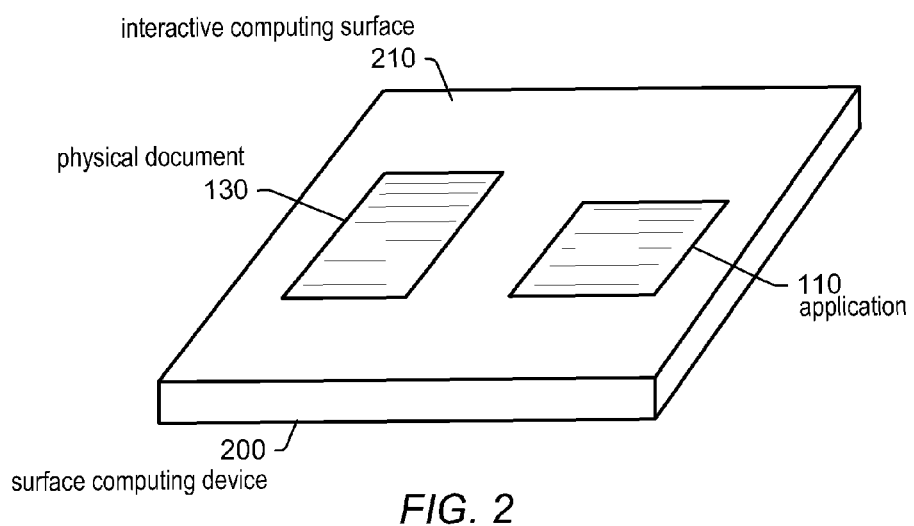
FIG. 2 is a block diagram illustrating one embodiment of an interactive document system integrated into a single surface computing device.

As shown in FIG. 1, computer system 100 and physical document interface 120 are discrete components that may be configured to communicate with one another. In another embodiment, the functionality of computer system 100 and physical document interface 120 may be provided by a single, integrated system. One example of such a system is illustrated in FIG. 2, which shows one embodiment of a surface computing device 200. Generally speaking, surface computing device 200 may be configured to execute applications, such as application 110. In some embodiments, surface computing device 200 may be configured to support applications and operating systems similar to those executed by computer system 100, described above. One example of surface computing device 200 may include the Microsoft Surface™ computer.

In the illustrated embodiment, surface computing device 200 includes an interactive computing surface 210. Interactive computing surface 210 may be configured to implement both input and output functionality. In one embodiment, interactive computing surface 210 may be a multifunctional device configured to implement some or all of the input and display functions of each of physical document interface 120 and computer system 100 described above. For example, interactive computing surface 210 may be configured to support tactile, optical, and/or electromagnetic types of input such as described above. In addition, interactive computing surface 210 may be configured to provide visual output similar to that which might be provided by a typical computer monitor or display device. For example, interactive computing surface 210 may include LCD display technology combined with a translucent or transparent tactile interface as well as document scanning capabilities. In some embodiments, the input/output capabilities may be uniform across interactive computing surface 210, while in other embodiments, different areas of interactive computing surface 210 may be configured to support different types or combinations of input/output functions.

Figure 3:
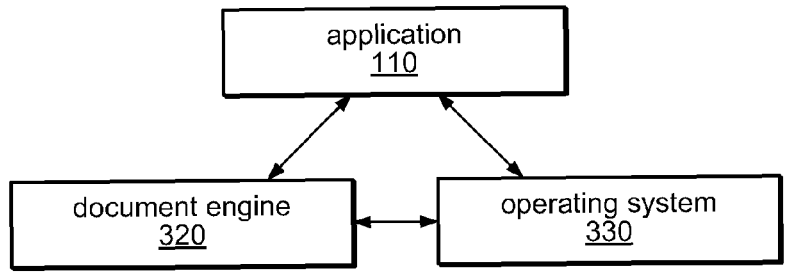
FIG. 3 is a block diagram illustrating one embodiment of a software architecture that may be configured to implement various features of the systems illustrated in FIG. 1 or FIG. 2.

FIG. 3 illustrates one embodiment of a software architecture that may be configured to implement various features of the systems illustrated in FIGS. 1-2. In the illustrated embodiment, application 110 is configured to interact with a document engine 320 as well as with an operating system 330. It is noted that in various embodiments, the elements of FIG. 3 may be implemented within a single system, such as computer system 100 or surface computing device 200, or may be distributed among several distinct computer systems. For example, application 110 may be executable by one computer system (e.g., computer system 100), while document engine 320 may be executable by a different system or device (e.g., physical document interface 120). It is contemplated that in various embodiments, the features of document engine 320 may be implemented by computer system 100, physical document interface 120, surface computing device 200, a distinct system, or any combination of these.

Document engine 320 may perform several functions in the service of correlating physical document 130 and application 110, and the functions may vary depending upon the particular embodiment of the system. Document engine 320 may be configured to receive and interpret data from physical document 130, such as data received from physical document interface 120 as described below. In one embodiment, document engine 320 may manage geometric mapping between the physical document 130 and its data, and the mapping may be used to establish correlation between physical document 130 and application 110. For example, as noted above, physical document 130 may include structured or unstructured content, which may be arranged at various locations on data surface(s) of physical document 130. As described in greater detail below in conjunction with the description of FIG. 4, in some embodiments document engine 320 may implement a coordinate system or other suitable system of reference. The coordinate or reference system may facilitate a mapping from information identifying a particular location or area within a data surface of physical document 130 to information that reflects the content indicated at that location or area.

In one embodiment, document engine 320 may also be configured to maintain a mapping showing the spatial relationship between physical document 130 and physical document interface 120. For example, such a mapping may reflect the position of physical document 130 relative to physical document interface 120. Such mappings may be used in some embodiments to allow visual cues provided by the system, such as those discussed below with respect to FIG. 4, to track physical document 130 if it moves on physical document interface 120. Such mappings may also play a role in positioning visual cues on or near physical document 130. Document engine 320 may be configured to provide data indicative of various types of mappings (e.g., the geometric and/or positional mappings discussed above, or any other suitable mappings) to application 110, and it may receive corresponding data from application 110.

In some embodiments, document engine 320 may facilitate the recognition of physical objects placed on the physical document interface 120, or of content indicated by such objects. For example, document engine 320 may be configured to manage optical character recognition (OCR) functions in some embodiments, which may facilitate the transformation of an image of a character represented on a physical document 130 (e.g., of bits representing pixel data) into an indication of the character itself (e.g., an ASCII code or other uniform representation of the character). Document engine 320 may exchange data related to the recognition process with application 110. Specifically, in some embodiments, using character recognition or other techniques, document engine 320 may be configured to extract data from physical document 120 and facilitate automatic entry of the extracted data, or selected portions of the data, into corresponding fields of application 110.

Document engine 320 may also be configured to coordinate the exchange of data and signals between the physical document interface 120 and application 110. In one embodiment, document engine 320 may send data and/or instructions to physical document interface 120 in response to activity generated by or on behalf of application 110. For example, document engine 320 may send visual cueing signals to the physical document interface. In some embodiments, the signals may cause selected portions of the physical document 130 to be illuminated, as described in greater detail below. Also, in some embodiments, document engine 320 may be configured to convey information received from physical document interface 120 to application 110, as in the data recognition and extraction examples discussed above.

In some embodiments, document engine 320 may be configured to interact with physical document interface 120 via device drivers or other system services that may be provided by operating system 330. For example, operating system 330 may correspond to a suitable version of an operating system such as Microsoft Windows™, Apple MacOS™, Linux™, Unix™, or any other suitable operating system, and may be configured to implement native or third-party device support for physical document interface 120. In other embodiments, document engine 320 may be configured to provide its own software driver or other interface support for interaction with physical document interface 120 independently of operating system 330.

The degree of cooperation and integration between document engine 320 and application 110 may vary in various embodiments. In one embodiment, document engine 320 may provide a standard application programming interface (API) to application 110 through which application 110 may interact with physical document interface 120. Document engine 320 may be tightly integrated with application 110, such that details regarding application 110's use of data types and document structure may also be visible to document engine 320. Alternatively, document engine 320 may be loosely integrated with application 110, such that document engine 320 may primarily operate to maintain mappings of application data and document content without being aware of how application 110 is using its data, or vice versa. In other instances, document engine 320 may be incorporated within application 110 or within operating system 330, and may not exist as a separate entity.

Interactive Document Management

Figure 4:
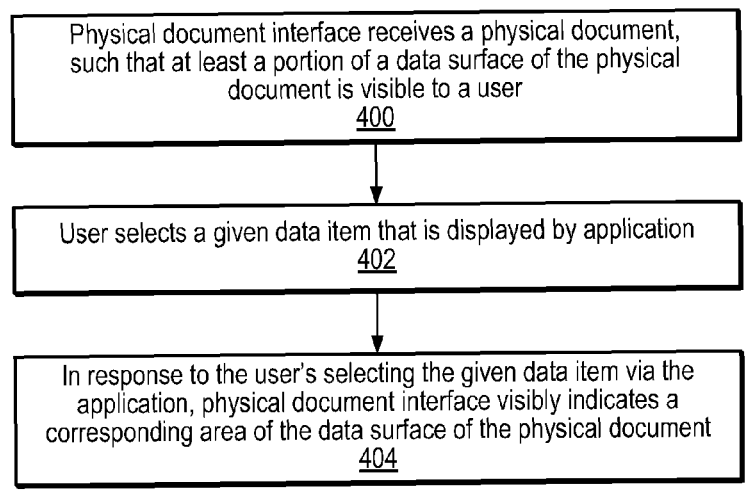
FIG. 4 is a flow diagram illustrating one embodiment of a method for assisting a user in the management of documents.

The systems illustrated in FIGS. 1-2, or suitable variations thereof, may be configured in various embodiments to perform any of a variety of tasks to assist a user in the management of documents. One embodiment of a method of operation of a system such as system 10 is shown in FIG. 4. In the illustrated embodiment, operation begins in block 400 where physical document interface 120 receives a physical document 130, such that at least a portion of a data surface of physical document 130 is visible to a user. For example, a user may place physical document 130 on physical document interface 120 such that a side of physical document 130 that includes data the user wishes to interact with is facing the user. In other embodiments, it is contemplated that physical document interface 120 may receive a document through an automated interface that requires little or no user intervention, such as a mechanical document feeder, for example.

The user selects a given application data item that is displayed by application 110 (block 402). Generally speaking, an application data item may correspond to any data item that may be displayed by application 110 via its user interface, such as text data, numerical data, graphical data, or audio data, for instance. For example, as noted above, application 110 may be a tax application that is configured to perform tax calculations using data items derived from various tax-related documents, such as tax returns, wage statements, and the like. In this example, the user may select a particular financial data item that is displayed by application 110, such as an item of personal income. In various embodiments, the user may select an application data item through appropriate combinations of touch, keystrokes, mouse gestures, or other suitable input to application 110. For example, application 110 may implement, via menus or other features, an interface through which a user may select an application data item for which a corresponding area of physical document 130 should be indicated.

In response to the user's selecting a given application data item via application 110, physical document interface 120 may visibly indicate a corresponding area of the data surface of physical document 130 (block 404). In one embodiment, computer system 100 may cause physical document interface 120 to visibly indicate a location on the surface of physical document 130 that includes one of the document data items corresponding to the application data item selected via the user interface of application 110. For example, application 110 may communicate information regarding the selected data item to document engine 320, which in turn may identify one or more locations of the physical document 130 that correspond to the selected application data item. In some embodiments, document engine 320 may be configured to actively manage the details of visibly indicating the corresponding area of physical document 130, for example, to control the manner and appearance of the visible indication. However, document engine 320 may delegate some aspects of managing visible indications to operating system routines, software drivers, or hardware features.

Continuing in the vein of the tax-related example discussed above, physical document 130 may be a tax form including various data fields at various locations within the document. In this example, document engine 320 may be configured to maintain tables or other data structures that reflect mappings or associations between data items within application 110 and corresponding features of physical document 130. In some embodiments, document engine 320 may maintain data structures that relate various data items within application 110 to areas of physical document 130 from which the data items were directly obtained (e.g., such that there exists a direct correspondence between a particular data value within application 110 and a particular area or field of physical document 130). For example, document engine 320 may map an "adjusted gross income" data value within application 110 with a corresponding field of a physical tax document 130.

The field of the document may be identified according to a suitable coordinate system. For example, document engine 320 may be configured to reference areas of physical document 130 using Cartesian or other suitable coordinates determined relative to the physical boundaries of physical document 130, or using landmarks within physical document 130 (e.g., particular textual or graphical features on the data surface of physical document 130 that may be employed as points of reference from which to express the locations of other document features), or using any other technique for representing the relationships between features of a document and their locations within the document.

In some embodiments, document engine 320 may be configured to relate various application data items within application 110 to areas of physical document 130 from which the application data items were indirectly derived. For example, the "adjusted gross income" data value within application 110 may be derived as a function of other data values that may appear within document data items (e.g., fields) of physical document 130, such as gross income and various above-the-line adjustments. In one embodiment, document engine 320 may represent these indirect relationships, while in other embodiments, indirect relationships between data items and other values from which the data items may be derived may be maintained by application 110 transparently to document engine 320.

In some embodiments, visible indication of a corresponding area of physical document 130 may be in the form of illuminating or otherwise visibly distinguishing a portion of physical document 130 itself. In other embodiments, visible indication for physical document 130 may appear in close proximity to physical document 130, but not necessarily on physical document 130 itself. For example, such indications may appear just outside the periphery of physical document 130. Still other embodiments may provide visibly illuminated indication both within and outside the periphery of physical document 130. Depending upon the embodiment, visible indications for physical document 130 may appear from above, from below, or from the periphery. Visible indications or cues for physical document 130 may assume a variety of types and forms, and may be combined in numerous ways. In some variations, coloring may be used to visibly distinguish corresponding areas of physical document 130. For instance, in the "adjusted gross income" example described earlier, application 110 may highlight the selected application data item using a particular color, and physical document interface 120 may highlight the corresponding field of physical tax document 130 in a similar or matching color. In some instances, multiple correspondences between physical document 130 and application 110 may be distinguished by assigning a different color to each set of correspondence. In other embodiments, correspondences between a selected application data item in application 110 and an area or location of physical document 130 may be visibly indicated using similar display techniques other than similar colors, such as similar animation, shading, or other techniques.

In other embodiments, visibly illuminated indications or cues may include balloons or cartoon bubbles, which may themselves contain other cues, such as text or images. For example, in response to a user's selecting an application data item via application 110, the system may illuminate a corresponding area of physical document 130 while simultaneously exhibiting an information bubble at the periphery of physical document 130, where the bubble and the illuminated area of physical document 130 may be joined by a lighted arrow or line.

According to various embodiments, visual indications, or cues, may include coloring, lighted regions, backlit regions, text, images, information-containing balloons, bubbles, or cartoon bubbles, graphical user interface widgets or controls, animation, connecting lines, dotted lines, patterned regions, arrows, lighted lines, geometric figures such as circles, ovals, triangles and squares, and so forth. According to the embodiment, visual cues may exist separately or in combination, and some visual cues may contain or be linked to others. For example, a cartoon bubble may contain text along with a widget to play related audio material. Depending on the embodiment, visual cues may also be augmented with auditory signals, such as beep and bells, or human or synthesized speech. Visual cues may or may not be interactive, according to the embodiments.

Additionally, it is contemplated that in some embodiments, visual indications that are generated with respect to physical document 130 may track changes in location of physical document 130 with respect to physical document interface 120. For example, if a user shifts physical document 130, physical document interface 120 may detect the new document location. Physical document interface 120 may responsively remap visual indications such that they appear in the same relationship to physical document 130 as they did prior to the document's relocation. In various embodiments, physical document interface 120 may remap such visual indications in a manner that is transparent to document engine 320, or physical document interface 120 may perform such remappings in collaboration with document engine 320.

It is contemplated that in some embodiments, the various types of visual indications described above may be generated with respect to an image or representation of physical document 130 instead of or in addition to being generated with respect to physical document 130 itself. For example, in one embodiment, physical document 130 may be placed face down on physical document interface 120, which may capture an image of physical document 130. Physical document interface 120 may then display the captured image along with the visual indications described above. For example, an interactive computing surface 210 such as that shown in FIG. 2 may be configured to receive physical document 130 in one area of the surface, display an image of physical document 130 in another area, and display application 110 in yet another area. Other variations are possible and contemplated.

Figure 5:
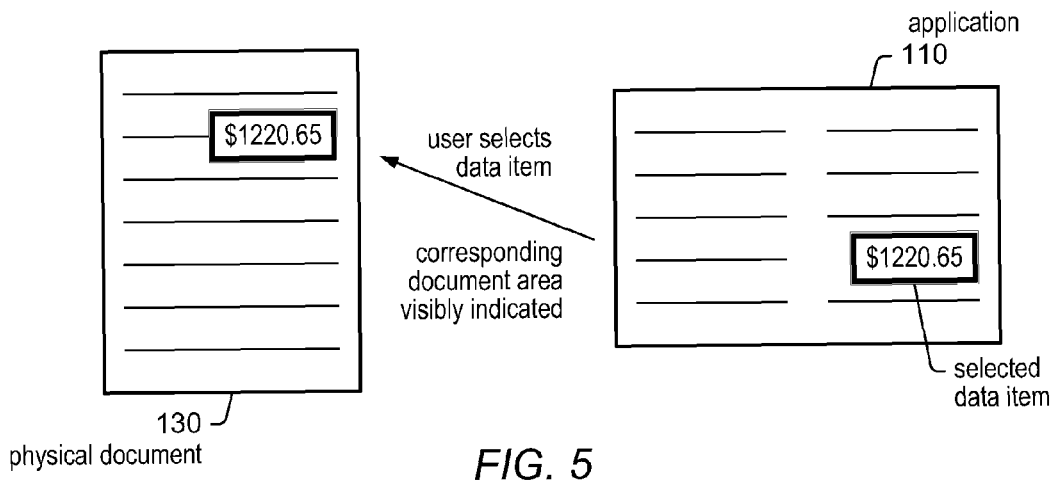
FIG. 5 is a block diagram illustrating one embodiment of the operations illustrated in FIG. 4.

One example illustrating the operations discussed above with respect to FIG. 4 is shown in FIG. 5. In the illustrated embodiment, application 110 is shown displaying a particular application data item: in this case, the value "$1220.65." In response to a user's selecting this data item, a corresponding area of physical document 130 is visibly indicated. As shown in FIG. 5, an area of the document corresponding to the document data item "$1220.65" is highlighted, for example through illumination provided by physical document interface 120. Various embodiments of the system may render the visual display of application 110 in diverse ways. For example, as illustrated in FIG. 1, the visible display of application 110 may appear on a computer monitor or other display device separate from physical document interface 120. In another embodiment, illustrated in FIG. 2, application 110 may be displayed on an interactive computing surface 210 which is also configured to serve as the physical document interface 120 for physical document 130. In certain variations, like the one illustrated in FIG. 2, interactive computing surface 210 may be an element of a surface computing device.

In some embodiments, operations similar to those described above may enable the user to determine whether the selected data value within application 110 properly corresponds to a data value indicated on physical document 130. For example, as described in greater detail below, the data value within application 110 may have been previously derived from physical document 130, for example by manual data entry, optical character recognition, or through other techniques. The process through which the data value was derived from the document contents may be subject to error, such as data miskeying, faulty character recognition, or other sources of error, resulting in a discrepancy between the data value used by application 110 and the value represented by physical document 130. In one embodiment, the techniques described above may enable a user to quickly determine the area of physical document 130 from which a data value was obtained, which may assist the user in determining whether that data value was correctly obtained.

In some embodiments, if a user detects a discrepancy between a data value within application 110 and a corresponding value represented by physical document 130, the user may correct the data value within application 110, such as by interacting with computer system 100. In other embodiments, physical document interface 120 may be configured to present an interface through which the user may provide corrected data. For example, the user may make a correction directly on physical document 130, and physical document interface 120 (e.g., in conjunction with document engine 320), may convert the user's entry to digital data (e.g., using OCR or other techniques) and communicate the data to application 110. In another example, document engine 320 may interact with physical document interface 120 to present an interactive interface through which the user may enter corrected data, e.g., via touch, gestures, or other suitable input. For example, document engine 320 may be configured to present windows, cartoon bubbles, or other features to the user via physical document interface 120. In some embodiments, such an interactive interface may be employed for original data entry in addition to or instead of correction of previously entered data. In one such embodiment, such an interactive interface may facilitate user data entry into an unfamiliar application 110, for example, in the event a user is familiar with the structure of physical document 130 but uncertain as to how to interact with application 110.

Figure 6:
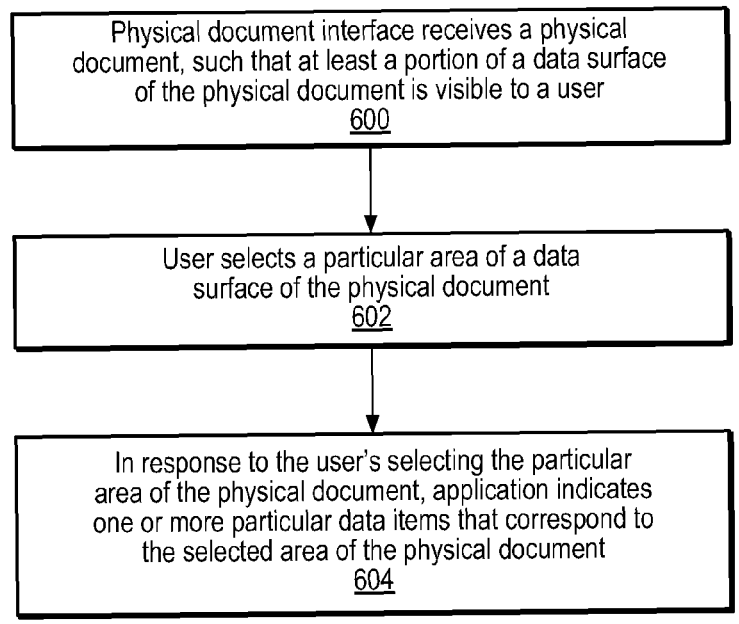
FIG. 6 is a flow diagram illustrating another embodiment of a method for assisting a user in the management of documents.

As just described, embodiments of a system such as that illustrated in FIGS. 1-2 may be configured to present information to a user via physical document interface 120 in response to user activity with respect to application 110. In some embodiments, a system such as system 10 may be alternatively or additionally configured to support the reverse operation, in which user activity with respect to physical document interface 120 may responsively result in corresponding activity with respect to application 110. One embodiment of such a method of operation of system 10 is shown in FIG. 6. In the illustrated embodiment, operation begins in block 600 where physical document interface 120 receives a physical document 130, such that at least a portion of a data surface of physical document 130 is visible to a user. For example, as noted above with respect to FIG. 4, a user or an automated interface may place physical document 130 on a physical document interface 120 so that a side containing data faces the user.

The user then selects a particular area of a data surface of physical document 130 (block 602). For example, as noted above, physical document 130 may be a tax form including various document data items, such as data fields, at various locations within the document. In this example, the user may select a particular area of physical tax document 130, such as a box containing an item of personal income. In various embodiments, the user may select a particular area of physical document 130 through various types of input activity that may be supported by physical document interface 120, such as appropriate combinations of touch, gesture, or other suitable input to select a particular area of the physical tax document 130. In some embodiments, selection of an area on physical tax document 130 may be accomplished directly, such a by touching the area with a finger, brush, stylus, or other object. In other embodiments, the selection may be less direct. For example, the user may simply point to the desired area, or may interact with physical document interface 120 through the use of another device or system, such as a laser pointer, a remotely-controlled pointing device, or a separate computer system. In various embodiments, physical document interface 120 may implement a system for detection of touch, gestures, light patterns or pulses, or other optical signaling. In other embodiments, physical document interface 120 may implement a system for selection by means of a movable illuminated pointer. In some embodiments, the pointer may project light through physical tax document 130. In other embodiments, the pointer may be projected onto physical tax document 130 from above. In some embodiments, physical document interface 120 may be configured to provide feedback to the user confirming the selected area of physical document 130, for example by visibly illuminating, outlining, animating, or otherwise visibly indicating the selected area, by providing audible cues such as clicks, beeps, or voice prompts, or by providing any other suitable type of feedback.

In response to the user's selecting a particular area of physical document 130, application 110 may indicate one or more particular application data items which correspond to the selected area of the physical document (block 604). In one embodiment, physical document interface 120 may transmit information about a particular selected area of physical document 130 to document engine 320. For example, physical document interface 120 may transmit geometric coordinates identifying the selected area to document engine 320. Document engine 320, in turn, may communicate information regarding the particular selected area to application 110, for example by mapping the coordinates provided by physical document interface 120 to one or more application data items within application 110, as described in greater detail below. Application 110 may then indicate one or more application data items that correspond to the selected area of physical document 130. For example, application 110 may highlight or distinguish the corresponding application data item(s) using any suitable interface technique, such as by altering the color or shading of the corresponding data item(s) relative to other items, employing animation or dynamic display techniques (e.g., flashing or alternating content), employing audible cues, or using other suitable techniques or combinations thereof. As noted previously, in some embodiments, physical document interface 120 may be configured to receive multiple different physical documents 130 at once. In some such embodiments, document engine 320 may facilitate the interaction of a single application 110 with multiple physical documents 130 (e.g., coordinating the interaction of a tax application 110 with multiple different types of tax forms such as Form W-2, Form 1099, etc.), or may facilitate the interaction of multiple distinct applications 110 with multiple physical documents 130.

Continuing with the tax-related example discussed earlier, physical document 130 may be a tax form including various fields at various locations within the document. As noted above, in one embodiment, document engine 320 may be configured to maintain data structures that reflect mappings between features of physical document 130, such as document data items, and corresponding application data items within application 110. For example, such data structures may include mappings between a coordinate system or other system of reference corresponding to physical document 130 and one or more data values within application 110. In one such embodiment, document engine 320 may be configured to utilize such mapping information to translate input data corresponding to the document area selected via physical document interface 120 into information indicative of data value(s) known to application 110.

For example, a user may select an area of a tax form via physical document interface 120 according to the techniques discussed above. In response, physical document interface 120 may be configured to communicate coordinates or other identifying information regarding the selected area to document engine 320. Document engine 320 may then apply the received information to its data structure to determine what data values within application 110 correspond to the selected area, if any. For example, the selected area of the document may correspond to an "adjusted gross income" field within application 110. Document engine 320 may then communicate to application 110 that the "adjusted gross income" field has been selected, and application 110 may correspondingly indicate one or more application data items corresponding to adjusted gross income. For example, application 110 may visibly highlight instances where adjusted gross income appear within application 110 using any suitable display technique.

In some embodiments, document engine 320 may employ decision logic configured to resolve imprecise input from physical document engine 320. For example, if a user selects an area using touch or gestures, the selected area may not correspond precisely to a field of physical document 130 or a corresponding data value within application 110 in the event that the user's input overlaps portions of physical document 130 that correspond to other document features. In various embodiments, document engine 320 may resolve such ambiguity or imprecision by weighting the mapping in favor of a particular portion of the selected area (e.g., its geometric center, a particular edge, or a particular region), by analyzing the degree of overlap between the selected area and various possible data value mappings, by taking historical or other user context into account (e.g., by considering the user's previous selection), or using any other suitable technique or combination of techniques.

In some embodiments, the relationship between a particular selected area of physical document 130 and corresponding data item(s) from application 110 may be complex or indirect, rather than a simple one-to-one matching of a selected area of physical document 130 to one application data item within application 110. In various embodiments, document engine 320 may be configured to map a particular selected area of document 130 to data items within application 110 upon which the particular selected area functionally depends, or to data items within application 110 that functionally depend upon the particular selected area. For example, the "adjusted gross income" field on physical tax document 130 may depend upon numerous data items from application 110 (e.g., wage income, interest income, etc.) that function together to compute an adjusted gross income figure. Alternatively, the "adjusted gross income" field of physical tax document 130 may reflect a data value on which one or more data items within application 110 depend (e.g., gross income tax due, net refund, etc.). In some variations, when a user selects an area corresponding to the "adjusted gross income" field on physical tax document 130, application 110 may respond by presenting, highlighting, or otherwise indicating several data items used by application 110 in computing the "adjusted gross income" field on physical tax document 130, or by indicating one or more data items that application 110 determines dependent upon the value of the "adjusted gross income" field.

As another example, physical document 130 may be a post card advertisement for an upcoming concert. Document engine 320 may relate the post card to a web site managing the concert using data from application 110 in the form of a web browser. In response to a user's indicating a price level on the post card advertisement, application 110, in the form of a web browser, may present an array of available seating choices, along with calendar dates, and other information. In certain embodiments, document engine 320 may represent complex or indirect relationships, while in others, complex or indirect relationships between data from application 110 and particular areas of physical document 130 may be derived and maintained by application 110 transparently to document engine 320.

Figure 7:
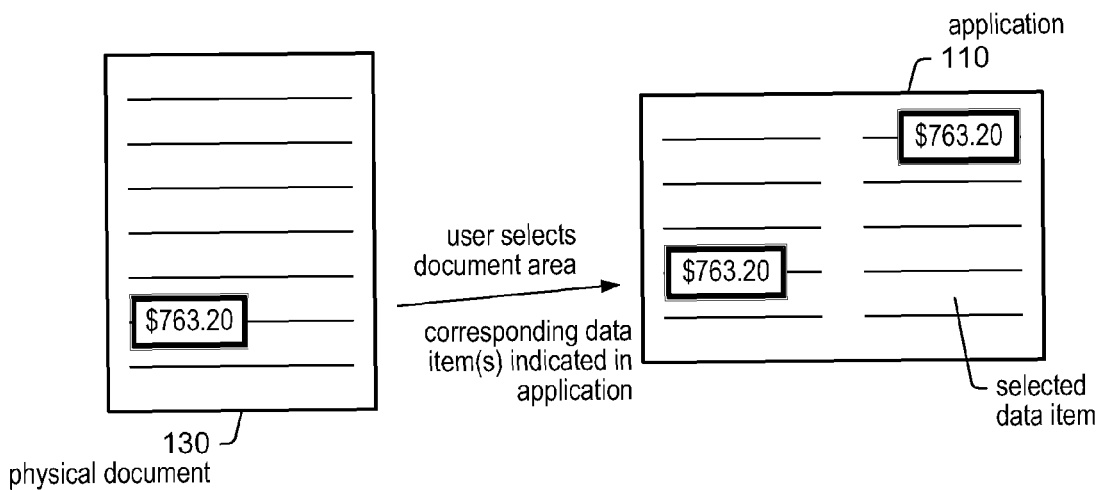
FIG. 7 is a block diagram illustrating one embodiment of the operations illustrated in FIG. 6.

One example illustrating the operations discussed above with respect to FIG. 6 is shown in FIG. 7. In the illustrated embodiment, physical document 130 is shown with a particular area, namely a box or field containing the value "$763.20." In response to a user's selecting this particular area of physical document 130, corresponding data items are indicated in application 110. As shown in FIG. 7, in this example, two data fields within application 110 are highlighted, where each highlighted field contains a data value corresponding to the one selected by the user. For example, the highlighted fields may be data values within application 110 that correspond to instances of the data field selected within physical document 130. In other instances, the highlighted fields within application 110 may correspond to data values that functionally depend on the data field selected within physical document 130, or data values on which the data field selected within physical document 130 functionally depends. Various embodiments of the system may render the visual display of application 110 in diverse ways. For example, as illustrated in FIG. 1, the visible display of application 110 may appear on a computer monitor or other device separate from physical document interface 120. In another embodiment, illustrated in FIG. 2, application 110 may be displayed on an interactive computing surface 210 that is also configured to serve as the physical document interface 120 for physical document 130. In certain variations, like the one illustrated in FIG. 2, interactive computing surface 210 may be an element of a surface computing device.

In some embodiments, operations similar to those described above may enable the user to determine whether selected particular areas from physical document 130 and the data they contain properly correspond to data values indicated within application 110. For example, as noted above with respect to FIG. 4, errors may occur in the entry of data values into application 110 from physical document 130. Using the techniques described above with respect to FIGS. 6-7, a user may be able to quickly verify whether data within a particular area of physical document 130 properly corresponds to data item(s) within application 110. In other instances, the techniques described above may enable a user to explore dependency relationships pertaining to a familiar or unfamiliar document. For example, using the above techniques, a user may select a particular data field within physical document 130 and observe, via application 110, those data values that rely on the particular data field, or those data values on which the particular data field relies. This may enable a user to understand the significance or scope of a discrepancy between physical document 120 and application 110, or may enable a user to understand more generally the significance of various data fields of physical document 120 as they relate to application 110.

As described in detail above, in various embodiments, a user may interact with physical document 130 in a variety of ways via physical document interface 120. When a user initially begins working with a particular physical document 130, physical document interface 120, document engine 320, and/or application 110 may be initialized with respect to the particular physical document 130 in a number of ways. In one embodiment, the user may explicitly provide to application 110, or to document engine 320, information sufficient to identify a type and/or a unique instance of physical document 130. For example, the user may select the document type from a list or may supply document identifier(s) that are generic to a document type (e.g., IRS Form 1040). The user may also supply information that narrows physical document 130 to a particular instance (e.g., a Social Security Number identifying a particular Form 1040).

In another embodiment, physical document interface 120 may capture information from physical document 130 that may facilitate automatic document identification. For example, the user may initially place physical document 130 face down on physical document interface 120, and image data may be captured from the document's data surface. Such data may be processed, for example, by document engine 320, to identify physical document 130. For example, document engine 320 may apply OCR techniques to attempt to identify physical document 130 from textual features. Document engine 320 may also identify physical document 130 from bar codes, graphical features, or other identifying marks. In some embodiments, the arrangement of features on a particular physical document 130 may form a signature that may be sufficient for document engine 320 to generically or uniquely identify the document, for example through application of a hash algorithm or other suitable algorithm.

In some embodiments automatic identification of physical document 130 may occur using image data captured from a surface other than the document's data surface. For example, depending on factors such as the translucency of the document 130 and capabilities of physical document interface 120, sufficient identifying information may be obtained from the reverse side of a physical document 130 that is placed face up on physical document interface 120. In other embodiments, physical document 130 may be identified on the basis of other document characteristics, such as its electromagnetic characteristics, an RFID tag, or any other suitable characteristics.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods of user interaction with physical documents 130 described above with respect to FIGS. 4-7. In particular, any of application 110, document engine 320, operating system 330, or other suitable combinations or partitions of the functionality of these entities may be implemented as such instructions. Such instructions may be executed to perform a particular computational function, such as generating, sending or, receiving a message, to implement mathematical functions such as integration, differentiation, convolution, etc., as well as to implement higher-order functions such as, operating system functionality, network communications functionality, application functionality, and/or any other suitable functions.

Figure 8:
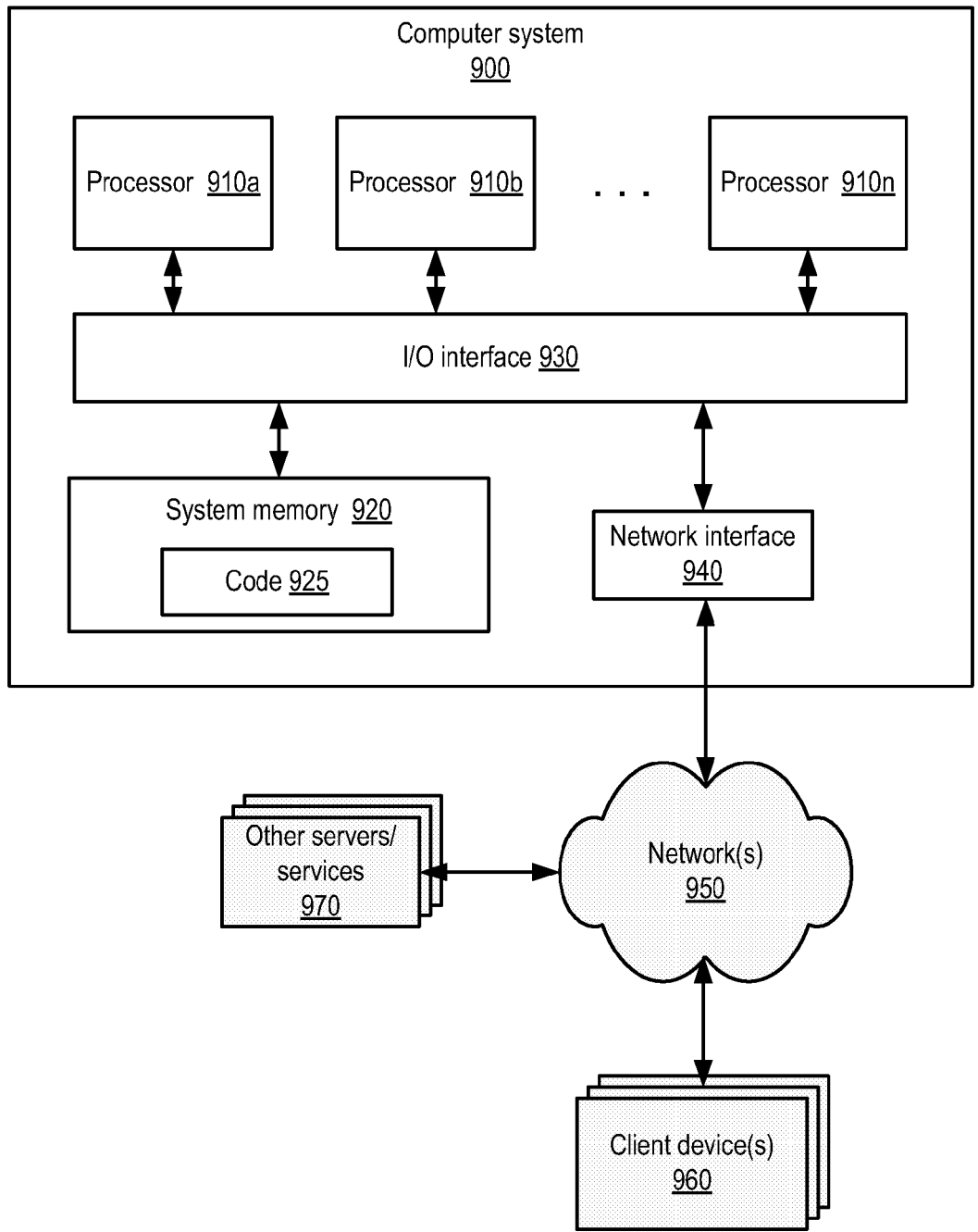
FIG. 8 is a block diagram illustrating an exemplary embodiment of a computer system.

One exemplary embodiment of a computer system including tangible, computer-accessible storage media is illustrated in FIG. 8. In the illustrated embodiment, computer system 900 includes one or more processors 910 coupled to a system memory 920 via an input/output (I/O) interface 930. Computer system 900 further includes a network interface 940 coupled to I/O interface 930. In different embodiments, system 900 may be variously configured as a server system, a desktop or notebook system, an embedded system, a handheld or portable client system, etc. In various embodiments, computer system 900 may be representative of computer system 100 of FIG. 1 or surface computing device 200 of FIG. 2.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 950, such as other computer systems or communications devices, for example. In particular, network interface 940 may be configured to allow communication between computer system 900 and client devices 960 and/or other servers/services 970 through various communications channels via network(s) 950. These client devices 960 may include various computing and communications devices, which may include elements similar to those of computer system 900. In particular, client devices 960 may include devices associated with various ones of other nodes 100, such as personal computers, telephony devices or other network-attached computing devices that users may employ to access network services, such as the message services offered by logical mesh network 10, for example. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. A computer-accessible medium may generally be accessible via transmission media or signals such as electrical, electromagnetic, or digital signals, which may be conveyed via a communication medium such as a network and/or a wireless link, such as may be implemented via network interface 940.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A system comprising:
    a physical document interface configured to receive a physical document having a surface including a plurality of document data items, such that at least a portion of said surface of the physical document is visible to a user;
    a device comprising a computer-readable storage medium storing program instructions executable by the device to implement an application, wherein the application is executable to display a user interface including a plurality of application data items;
    wherein each of the plurality of data items is selectable via the user interface,
    wherein, in response to selection of a given one of the application data items via the user interface, the device is configured to cause the physical document interface to visibly indicate a location on said surface of the physical document that includes one of the document data items corresponding to the one of the application data items selected via the user interface of the application,
    wherein said physical document interface is further configured to receive input data from said physical document and to communicate said input data to said device, wherein to receive input data from said physical document, said physical document interface is further configured to scan optical data from said surface of said physical document,
    and
    wherein in response to said user selecting a particular area of said surface of said physical document, said application is further configured to indicate to said user one or more particular application data items corresponding to said particular area of said surface of said physical document.

2. The system of claim 1, wherein said particular area of said surface corresponds to a particular one of said document data items, and wherein to indicate to said user said one or more particular application data items corresponding to said particular area, said application is further configured to indicate one or more data values within said application that are determined dependent upon said particular document data item.

3. The system as recited in claim 1, wherein said device and said physical document interface are implemented by a single integrated device configured to provide an interactive computing surface, wherein said interactive computing surface is configured to receive input data from said physical document and to display output data to said user.

4. The system as recited in claim 1, wherein to visibly indicate said location on said surface of said physical document, said physical document interface is further configured to illuminate said corresponding area.

5. The system as recited in claim 1, wherein to visibly indicate said location on said surface of said physical document, said physical document interface is further configured to display an indication outside the periphery of said physical document.

6. The system as recited in claim 1, further comprising a computer-executable document engine configured to identify said physical document to said application.

7. The system as recited in claim 6, wherein said document engine is further configured to identify said physical document dependent upon image data captured from said physical document.

8. The system as recited in claim 6, wherein said document engine is further configured to derive said application data items from said physical document and to communicate said application data items to said application.

9. A method, comprising:
    a physical document interface receiving a physical document, such that at least a portion of a data surface of said physical document is visible to a user;
    receiving, by said physical document interface, input data from said physical document and communicating said input data to an application configured to execute on a device coupled to the physical document interface, wherein said application is further configured to display a user interface comprising a plurality of application data items, wherein said physical document interface receiving input data from said physical document comprises said physical document interface scanning optical data from said surface of said physical document;
    in response to said user selecting a given one of said plurality of application data items displayed by said application, said physical document interface visibly indicating a corresponding area within said portion of said data surface of said physical document to said user;
    detecting, by said physical document interface, a selection by said user of a particular area of said data surface of said physical document; and
    communicating, by said physical document interface, said selection of said particular area to said application and causing said application to indicate to said user one or more particular application data items, of said plurality of application data items, corresponding to said particular area of said data surface of said physical document.

10. The method as recited in claim 9, wherein said physical document interface is implemented by a single integrated device configured to provide an interactive computing surface, and wherein the method further comprises said interactive computing surface receiving input data from said physical document and displaying output data to said user.

11. The method as recited in claim 10, further comprising said integrated device executing said application.

12. The method as recited in claim 9, wherein said physical document interface visibly indicating said corresponding area within said portion of said data surface of said physical document to said user comprises said physical document interface illuminating said corresponding area.

13. The method as recited in claim 9, wherein said physical document interface visibly indicating said corresponding area within said portion of said data surface of said physical document to said user comprises said physical document interface displaying an indication outside the periphery of said physical document.

14. The method as recited in claim 9, further comprising a computer-executable document engine identifying said physical document to said application.

15. The method as recited in claim 14, wherein said document engine further identifying said physical document occurs dependent upon image data captured from said physical document.

16. The method as recited in claim 14, further comprising said document engine deriving said data items from said physical document and to communicating said data items to said application.

17. A computer-accessible storage medium storing program instructions, wherein the program instructions are computer-executable to:
  detect a physical document interface receiving a physical document;
  receive input data from said physical document via said physical document interface and communicate said input data to an application configured to execute on a device coupled to said physical document interface, wherein said application is further configured to display a user interface comprising a plurality of application data items, wherein to receive said input data from said physical document via said physical document interface comprises said physical document interface scanning optical data from a data surface of said physical document;
  in response to a user selecting a given one of said plurality of data items displayed by said application, visibly indicate via said physical document interface a corresponding area of said physical document to said user;
  detect a selection by said user via said physical document interface of a particular area of said data surface of said physical document;
  communicate said selection of said particular area to said application;
  and
  cause said application to indicate to said user one or more particular application data items, of the plurality of application data items, corresponding to said particular area of said data surface of said physical document.

18. The computer-accessible storage medium as recited in claim 17, wherein said physical document interface is implemented by a single integrated device configured to provide an interactive computing surface, and wherein the program instructions are executable by said integrated device to implement said interactive computing surface receiving input data from said physical document and displaying output data to said user.

19. The computer-accessible storage medium as recited in claim 17, wherein to visibly indicate said corresponding area of said physical document to said user via said physical document interface, the program instructions are further computer-executable to instruct said physical document interface to illuminate said corresponding area.

20. The computer-accessible storage medium as recited in claim 17, wherein to visibly indicate said corresponding area of said physical document to said user via said physical document interface, the program instructions are further computer-executable to instruct said physical document interface to display an indication outside the periphery of said physical document.

\* \* \* \* \*